United States Patent
Watanabe

(10) Patent No.: US 8,594,477 B2
(45) Date of Patent: Nov. 26, 2013

(54) OPTICAL WAVEGUIDE DEVICE AND METHOD OF MANUFACTURING THEREOF

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 41 days.

(21) Appl. No.: 13/256,168

(22) PCT Filed: Mar. 15, 2010

(86) PCT No.: PCT/JP2010/054334
§ 371 (c)(1),
(2), (4) Date: Sep. 12, 2011

(87) PCT Pub. No.: WO2010/106995
PCT Pub. Date: Sep. 23, 2010

(65) Prior Publication Data
US 2012/0002931 A1    Jan. 5, 2012

(30) Foreign Application Priority Data
Mar. 17, 2009   (JP) .................................. 2009-063736

(51) Int. Cl.
*G02B 6/10*    (2006.01)

(52) U.S. Cl.
USPC ............................................ 385/129; 257/98

(58) Field of Classification Search
USPC .................... 385/123, 129; 216/24; 257/98
See application file for complete search history.

(56) References Cited

U.S. PATENT DOCUMENTS

| | | | |
|---|---|---|---|
| 5,042,709 A * | 8/1991 | Cina et al. ..................... | 228/105 |
| 2001/0010743 A1 * | 8/2001 | Cayrefourcq et al. ........ | 385/88 |
| 2002/0018280 A1 * | 2/2002 | Noda ............................ | 359/248 |
| 2002/0028046 A1 * | 3/2002 | Delprat .......................... | 385/52 |
| 2002/0105992 A1 * | 8/2002 | Arakawa et al. ............... | 372/50 |
| 2004/0017977 A1 * | 1/2004 | Lam et al. ...................... | 385/49 |
| 2007/0274653 A1 * | 11/2007 | Watanabe et al. ............. | 385/129 |
| 2009/0026479 A1 * | 1/2009 | Hikita et al. .................... | 257/98 |
| 2009/0116803 A1 * | 5/2009 | Watanabe et al. ............. | 385/129 |

FOREIGN PATENT DOCUMENTS

| | | | | |
|---|---|---|---|---|
| CN | 101354462 | | 1/2009 | |
| EP | 1160602 A1 * | | 12/2001 | ............... G02B 6/42 |
| JP | 08-327841 | | 12/1996 | |
| JP | 08327841 A * | | 12/1996 | ............. G02B 6/122 |
| JP | 2823044 | | 9/1998 | |
| JP | 2001108871 A * | | 4/2001 | ............... G02B 6/42 |
| JP | 2002-111113 | | 4/2002 | |
| JP | 2007133011 A * | | 5/2007 | |
| JP | 2007-286340 | | 11/2007 | |

OTHER PUBLICATIONS

International Search Report, PCT/JP2010/054334, Apr. 6, 2010.
Chinese Official Action—201080012377.9—Nov. 5, 2012.

* cited by examiner

*Primary Examiner* — Charlie Peng
*Assistant Examiner* — Peter Radkowski
(74) *Attorney, Agent, or Firm* — Young & Thompson

(57) ABSTRACT

In an optical waveguide device of the present invention, optical element mount (17) includes first base block (19a) for supporting first optical element (18a) and second base block (19b) for supporting second optical element (18b) that has an active layer depth smaller than that of first optical element (18a). Second base block (19b) is formed from stacks of upper clad layers whose number of stacks is larger than that of first base block (19a). Difference (h1) in height between the first and second base blocks is equal to difference (d1−d2) in active layer depth between the first and second optical elements.

12 Claims, 5 Drawing Sheets

OPTICAL WAVEGUIDE DEVICE AND METHOD OF MANUFACTURING THEREOF

TECHNICAL FIELD

The present invention relates to an optical waveguide device including an optical waveguide and optical element mount on a substrate, and a method of manufacturing thereof.

BACKGROUND ART

Optical transceivers used in an optical access market are broadly divided into a micro-optics modules including optical elements, such as a laser diode (LD) and a photodiode (PD), and optical components, such as a thin film filter and a lens; and a PLC (planer light-wave circuit) module configured by making a quartz waveguide on a silicon substrate and surface-mounting an optical element. Among them, methods of mounting an optical component, such as an optical element, in the PLC module include a passive alignment method as a mounting method without the need to adjust the optical axis.

In a passive alignment mounting, the position of an optical element in the planar direction with respect to an optical waveguide chip is determined by image detecting recognition of alignment markers provided on both using transparent, infrared light. The position in the vertical direction is determined by the height of a base block supporting the optical element. The height of the base block is accurately adjusted in the manufacturing process. Accordingly, an optical axis height with respect to the optical waveguide can accurately be adjusted by only mounting an optical component on the base.

JP2823044B (hereinafter, referred to as Patent Literature 1) discloses a related optical waveguide device. FIGS. 1A and 1B are perspective views showing optical waveguide device 100 described in Patent Literature 1. Optical waveguide device 100 includes optical waveguide 116 and optical element mount 117. Optical waveguide 116 includes waveguide formation layer 115 including lower clad layer 112, core layer 113 and upper clad layers 114a and 114b formed on silicon substrate 111. Optical element mount 117 is formed by removing a part of optical waveguide formation layer 115. An end face of optical waveguide 116 exposed by removing the part of optical waveguide formation layer 115 is optically coupled with light emitting element 118 mounted on optical element mount 117.

Optical element mount 117 includes base blocks 119 and alignment markers 120, on which light emitting element 118 is mounted. Optical coupling between light emitting element 118 and an end face of optical waveguide 117 requires alignment in height between active layer 121 of light emitting element 118 mounted on optical waveguide device 100 and core layer 113.

FIG. 2 is an enlarged sectional view of light emitting element 118 and base block 119. As shown in FIG. 2, in a case where the active layer depth of light emitting element 118 is d1, height h1 of base block 119 is adjusted so as to agree with the difference between the height from silicon substrate 111 to core layer 113 (optical axis height) and active layer depth d1 of light emitting element 118.

JP2002-111113A (hereinafter, referred to as Patent Literature 2) discloses an optical module that determines the height of an optical element mounted in a passive alignment manner by means of the height of bump 9 for tentative connection.

The technique disclosed in Patent Literature 2 allows the optical element to be accurately mounted.

SUMMARY OF INVENTION

In a case of mounting optical elements, active layer depths d1 of the respective optical elements are not necessarily identical to each other. FIG. 3 is a partial sectional view in which optical elements with different active layer depths are mounted on optical waveguide device 100 shown in FIGS. 1A and 1B.

For instance, in a case of adjusting height h1 of base block 119 to optical element 118a with active layer depth d1, the mounting of optical element 118b that is shorter in active layer depth than optical element 118a lowers the position of active layer 121 of optical element 118b in comparison with active layer 121 of optical element 118a. This prevents the optical axes from being aligned with each other.

In both of the optical waveguide device described in Patent Literature 1 and the optical module described in Patent Literature 2, the height of the base block or the bump for tentative connection having been formed is even. Accordingly, an optical element with a different active layer depth d1 cannot be mounted at a height capable of being optically coupled to the core.

An exemplary object of the present invention is to provide an optical waveguide device whose optical elements with different active layer depths are mounted such that the respective optical axes are aligned with each other, and a method of manufacturing thereof.

A optical waveguide device according to an exemplary aspect of the present invention includes an optical waveguide consisting of an optical waveguide formation layer comprises a lower clad layer, a core layer and an upper clad layer formed on a substrate, and includes an optical element mount on which optical elements are mounted in an area where a part of the optical waveguide formation layer is removed, at least one optical element from among the optical elements being optically coupled to an end face of the optical waveguide exposed by removing the part of the optical waveguide formation layer, wherein the optical element mount comprises: a first base block that supports a first optical element that is one optical element from among the optical elements; and a second base block that supports a second optical element that is one optical element of the optical elements, the second optical element having an active layer depth smaller than that of the first optical element, and wherein the second base block is formed from upper clad layers whose number of stacks is larger than that of the first base block, and a difference in height between the first and second base blocks is equal to a difference in the active layer depth between the first and second optical elements.

A method of manufacturing an optical waveguide device according to an exemplary aspect of the present invention, the optical wave guide device including an optical waveguide consisting of an optical waveguide formation layer that comprises a lower clad layer, a core layer and an upper clad layer formed on a substrate, and the optical wave guide device including an optical element mount on which optical elements are mounted in an area where a part of the optical waveguide formation layer is removed, at least one optical element from among the optical elements being optically coupled to an end face of the optical waveguide exposed by removing the part of the optical waveguide formation layer, the method includes: forming the lower clad layer and the core layer on the substrate; forming a waveguide by patterning the core layer; forming stacks of upper clad layers on a part to be the optical waveguide and at least a part to be the optical element mount after the patterning; and etching of the stacks of upper clad layers forms a first base block for supporting a first optical element that is one optical element from among the optical elements, and a second base block for supporting a second optical element that has an active layer depth smaller than that of the first optical element from among the optical elements, wherein the second base block is formed from stacks of upper clad layers whose number of stacks is larger than that of the first base block, and the first and second base blocks are formed such that a difference in height between the first and second base blocks is equal to a difference in active layer depths between the first and second optical elements.

DESCRIPTION OF EMBODIMENTS

First Exemplary Embodiment

Figure 1A:
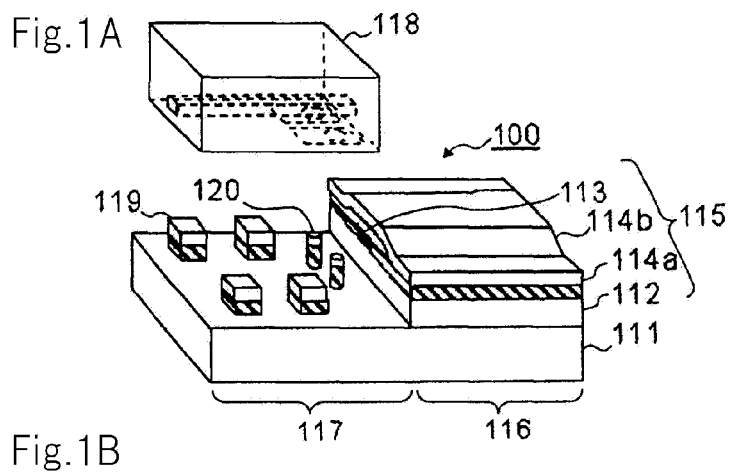
FIG. 1A is a perspective view showing an optical waveguide device disclosed in Patent Literature 1.
Figure 1B:
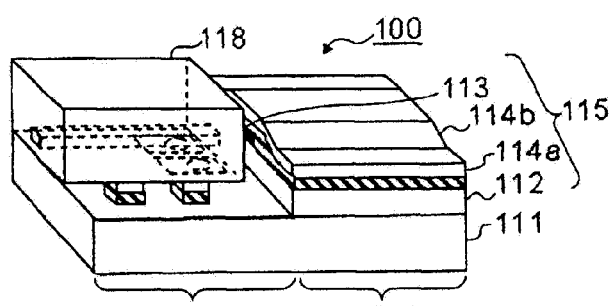
FIG. 1B is a perspective view showing the optical waveguide device disclosed in Patent Literature 1.
Figure 2:
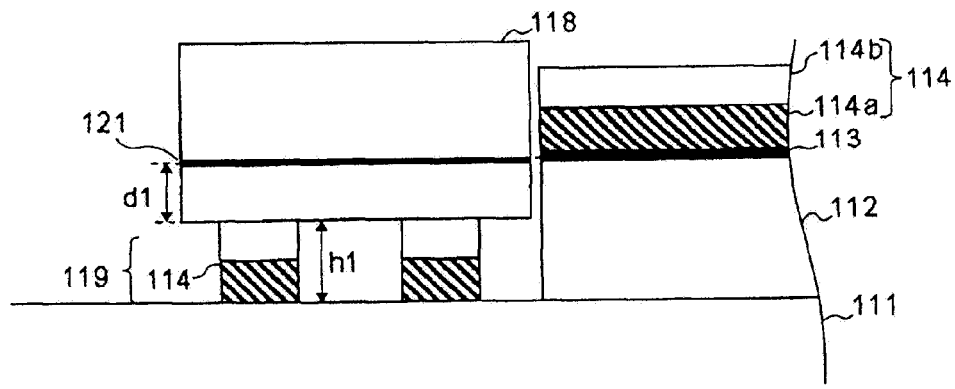
FIG. 2 is an enlarged sectional view of an optical element and a base block in the optical waveguide device shown in FIGS. 1A and 1B.
Figure 3:
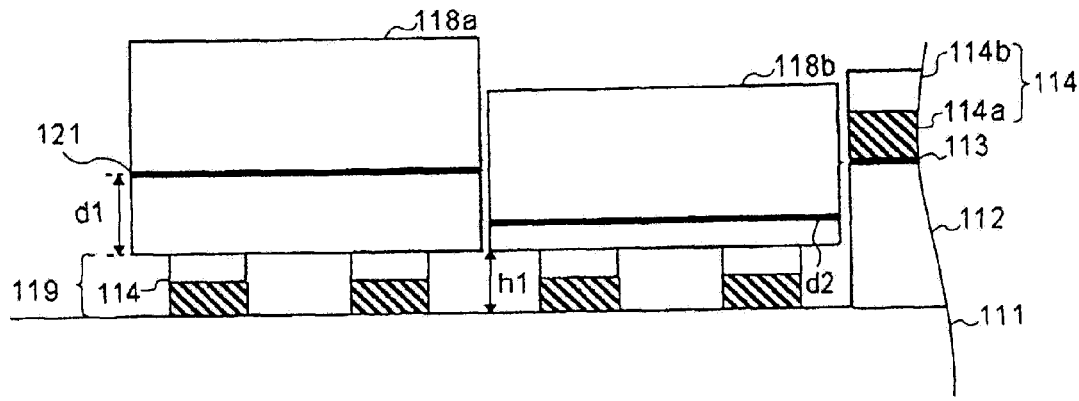
FIG. 3 is a partial sectional view in a case where optical elements having different active layer depths are mounted in the optical waveguide device shown in FIGS. 1A and 1B.
Figure 4:
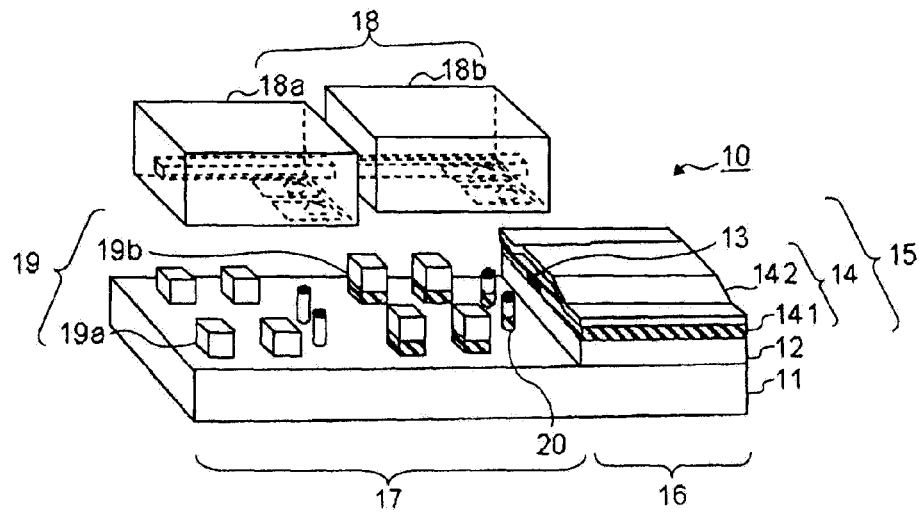
FIG. 4 is a perspective view showing an optical waveguide device according to a first exemplary embodiment of the present invention.

FIG. 4 is a perspective view showing optical waveguide device 10 according to a first exemplary embodiment of the present invention. Optical waveguide device 10 includes optical waveguide 16 and optical element mount 17. Optical waveguide 16 includes optical waveguide formation layer 15, which includes lower clad layer 12, core layer 13 and upper clad layers 141 and 142 formed on silicon substrate 11. Optical element mount 17 is formed by removing a part of optical waveguide formation layer 15, and includes base blocks 19 for mounting optical elements 18. FIG. 4 shows an example of mounting two optical elements 18a and 18b. Hereinafter, in a case without the need for discrimination between optical elements 18a and 18b, the elements are collectively referred to as optical element 18. Optical waveguide device 10 may include alignment markers 20 used for alignment when mounting optical element 18.

An end face of optical waveguide 16 is exposed by removing a part of optical waveguide formation layer 15. The end face of optical waveguide 16 (optical waveguide) and optical element 18 mounted on optical element mount 17 are optically coupled to each other. Optical element 18 may be, for instance, a laser diode (LD) or a photodiode (PD).

Optical elements 18a and 18b differ from each other with respect to the depth of active layer 21 (hereinafter, referred to as active layer depth). Here, the active layer depth is a depth from the active layer of the optical element to the base (d1 and d2 shown in FIG. 5).

Figure 5:
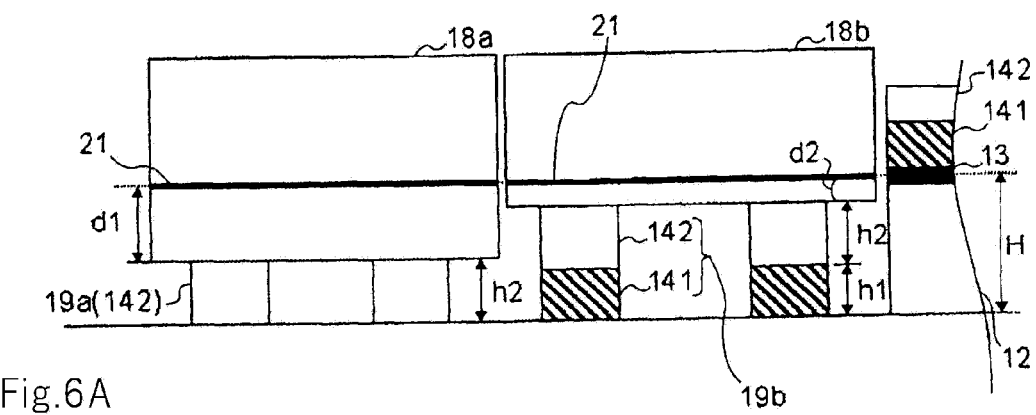
FIG. 5 is an enlarged sectional view of optical elements and base blocks in the optical waveguide device shown in FIG. 4.

FIG. 5 is an enlarged sectional view of optical elements 18 and base blocks 19 in the optical waveguide device shown in FIG. 4. In an example shown in FIG. 5, base block 19a supports optical element 18a that has a large active layer depth; base block 19b supports optical element 18b that has a small active layer depth. Active layer depth d1 of optical element 18a is larger than active layer depth d2 of optical element 18b. Accordingly, height h2 of base block 19a supporting optical element 18a is set smaller than height (h1+h2) of base block 19b supporting optical element 18b. Hereinafter, as with optical element 18, in a case without the need for discrimination between base blocks 19a and 19b, the blocks are collectively referred to as base block 19.

Height h2 of base block 19a and height (h1+h2) of base block 19b are determined such that sum (d1+h2) of active layer depth d1 and height h2 is equal to sum (d2+(h1+h2)) of active layer depth d2 and height (h1+h2). In order to align the end face of optical waveguide formation layer 15 and the optical axis, provided that the height from silicon substrate 11 to the core layer (hereinafter, referred to as optical axis height) is H, what needs to be determined is that height h2 of base block 19a is equal to difference (H−d1) between optical axis height h and active layer depth d1, and what needs to be determined is that height (h1+h2) of base block 19b is equal to difference (H−d2) between optical axis height H and active layer depth d2. Accordingly, even in a case where optical elements 18a and 18b that have different active layer depths are mounted, the optical axes of optical elements 18a and 18b and the end face of optical waveguide 16 can be optically aligned with each other, thereby allowing optical coupling. In this specification, "alignment of optical axes" includes not only a case of complete alignment of the optical axes but also a case where the optical axes are intentionally deviated for the sake of adjusting optical intensity when the optical axes are adjusted.

Base block 19 is formed from a film common to that of upper clad layer 14. The height of base block 19 can be adjusted by changing the thickness or the number of stacks of upper clad layer 14. The description will be made using the example shown in FIG. 5. Base block 19b is formed by forming upper clad layer 141 (hereinafter, referred to as first upper clad layer 141) with a height identical to height h1 and subsequently stacking upper clad layer 142 (hereinafter, referred to as second upper clad layer 142) with a height identical to height h2. Base block 19a is formed from second upper clad layer 142 with the height identical to height h2.

Thickness h2 of second upper clad layer 142 is determined as (H−d1) by subtracting active layer depth d1 from optical axis height H. Thickness h1 of first upper clad layer 141 is determined as (H−d2−h2) by subtracting active layer depth d2 and thickness h2 of second upper clad layer 142 from optical axis height H. This adjustment of the thickness of upper clad layer 14 to be stacked allows height (h1+h2+d2) of the optical axis of optical element 18b supported by base block 19b and height (h2+d1) of the optical axis of optical element 18a supported by base block 19a to be made to match with optical axis height (H) of the core layer.

Upper clad layer 14 may employ either a silicon dioxide film or a silicon nitride film, whose refractive indices can be changed by doping P, Ge, B, Ti or the like. These films can be formed from, for instance, an atmospheric pressure CVD (chemical vapor deposition) method, a vacuum CVD method, a plasma CVD method, a flame hydrolysis deposition method. At least one layer of upper clad layer 14 may preferably be a low-melting silicon oxide film (boro-phospho silicate glass film: BPSG film) doped with boron (B), phosphorus (P) or the like. The BPSG film has a low melting point, thereby facilitating implantation of a core during reflow for planarization.

Base block 19 can be formed by forming upper clad layer 14 and subsequently etching an unnecessary part on optical element mount 17. Etching methods include dry and wet etching methods. However, it is preferable to employ anisotropic dry etching, such as reactive-ion etching (RIE), ion beam etching (IBE) and reactive ion beam etching (RIBE), in order to secure flatness and verticality of the end face.

Lower clad layer 12 and core layer 13 may be formed from materials and methods identical to those of upper clad layer 14. However, core layer 13 is formed from a film with a refractive index higher than that of lower and upper clad layers 12 and 14.

Figure 6A:
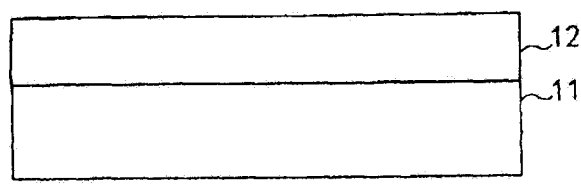
FIG. 6A is a sectional view showing an example of manufacturing the optical waveguide device shown in FIG. 4.

FIGS. 6A to 6I are sectional views showing a method of manufacturing optical waveguide device 10 shown in FIG. 4. The method of manufacturing optical waveguide device will hereinafter be described. First, lower clad layer 12 is formed on silicon substrate 11, and an annealing process is applied thereto as necessary (FIG. 6A).

Figure 6B:
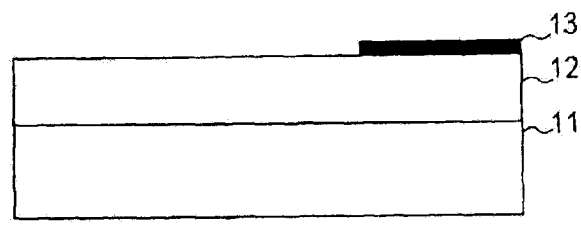
FIG. 6B is a sectional view showing the example of manufacturing the optical waveguide device shown in FIG. 4.

Next, core layer 13 is formed on lower clad layer 12 and then patterned by photolithography and dry etching, thus forming a waveguide (FIG. 6B). An annealing process is applied before or after patterning of core layer 13, as necessary.

Figure 6C:
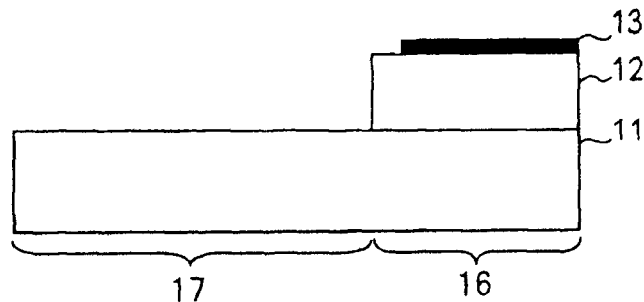
FIG. 6C is a sectional view showing the example of manufacturing the optical waveguide device shown in FIG. 4.

Subsequently, lower clad layer 12 on a part where optical element 18 is to be mounted, that is, on optical element mount 17, is removed (FIG. 6C).

At this time, etching is performed by means of RIE up to the part of lower clad layer 12 and then the rest of lower clad layer 12 is wet-etched, allowing preventing silicon substrate 11 from being etched. This is because, although some of the silicon substrate is etched in a case of entirely removing lower clad layer 12 by means of RIE, wet-etching using a hydrofluoric etchant does not etch the silicon substrate.

Figure 6D:
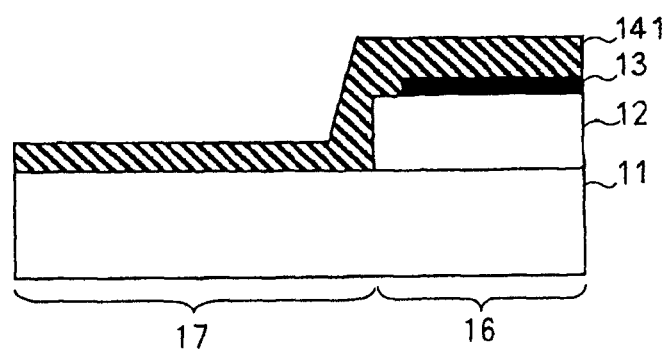
FIG. 6D is a sectional view showing the example of manufacturing the optical waveguide device shown in FIG. 4.

Subsequently, first upper clad layer 141 is formed on lower clad layer 12 and core layer 13, and an annealing process is applied thereto as necessary (FIG. 6D). The thickness of first upper clad layer 141 is equal to a difference, that is h1, between height (h1+h2) of base block 19b (see FIG. 5) supporting optical element 18b having a smaller active layer depth and height h2 of base block 19a (see FIG. 5) supporting optical element 18a having a larger active layer depth.

Figure 6E:
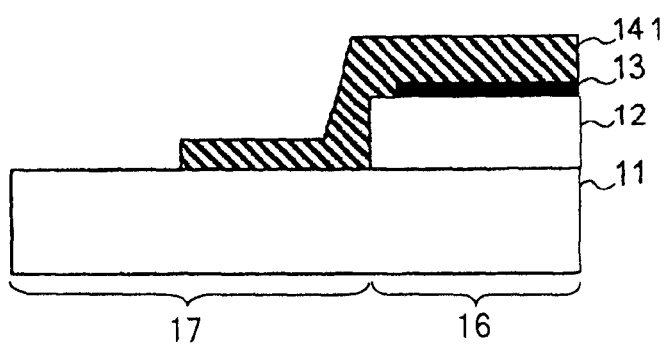
FIG. 6E is a sectional view showing the example of manufacturing the optical waveguide device shown in FIG. 4.

At this time, the upper clad layer may be a BPSG film with a lower softening point, and may be reflowed at a high temperature of 800° C. or higher after film formation. This allows a narrow gap between cores caused by patterning of core layer 13 to be filled. Further unevenness between optical element mount 17 and optical waveguide 16 formed in FIG. 6C can be evened, thereby improving the surface flatness of first upper clad layer 141. This allows a subsequent patterning process to be relatively facilitated. Next, first upper clad layer 141 on optical waveguide 16 and on optical element mount 17, except for parts on which base block 19a supporting optical element 18a with a larger active layer depth is formed, is removed, thereby exposing the silicon substrate (FIG. 6E).

Figure 6F:
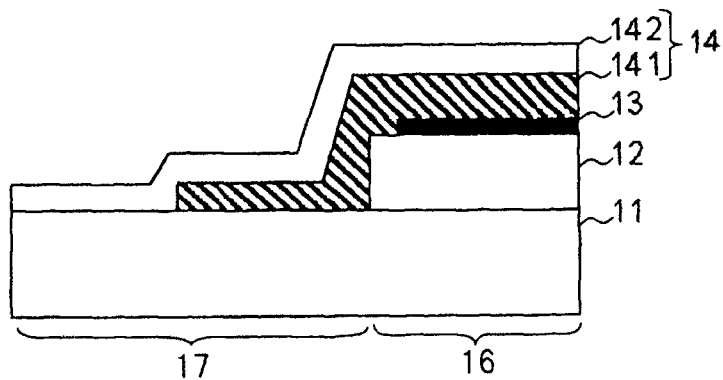
FIG. 6F is a sectional view showing the example of manufacturing the optical waveguide device shown in FIG. 4.

Next, second upper clad layer 142 is formed, and an annealing process is applied thereto as necessary (FIG. 6F). The thickness of second upper clad layer 142 is equal to height h2 of base block 19a supporting optical element 18a that has the larger active layer depth. On the other hand, the height of base block 19b supporting optical element 18b that has the smaller active layer depth becomes the sum (h1+h2) by forming second upper clad layer 142 on first upper clad layer 141 formed at the position of base block 19b.

Figure 6G:
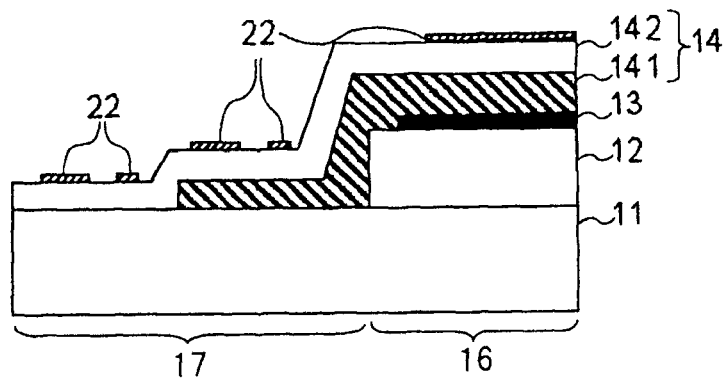
FIG. 6G is a sectional view showing the example of manufacturing the optical waveguide device shown in FIG. 4.

Next, a light shield film and a photoresist film are stacked. Mask 22 for forming base block 19 is patterned on the light shield film by means of photolithography (FIG. 6G). The light shield film is preferably a chromium film resistant to etching by RIE. Here, a mask for forming alignment marker 20 may be patterned together with the mask for forming base block 19.

Figure 6H:
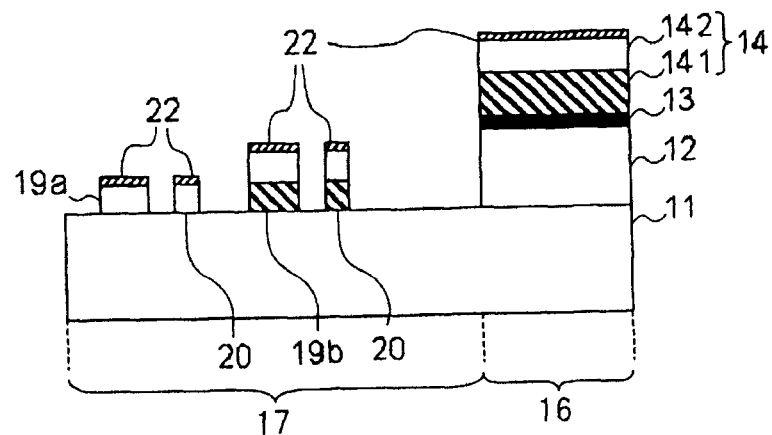
FIG. 6H is a sectional view showing the example of manufacturing the optical waveguide device shown in FIG. 4.

Next, while the end face of optical waveguide 16 is exposed by dry etching using the patterned light shield film as mask 22, base block 19 is formed (FIG. 6H). In a case where the mask for forming alignment marker 20 is formed together with the mask for forming base block 19, both base block 19 and alignment marker 20 are formed in one process by dry etching.

Figure 6I:
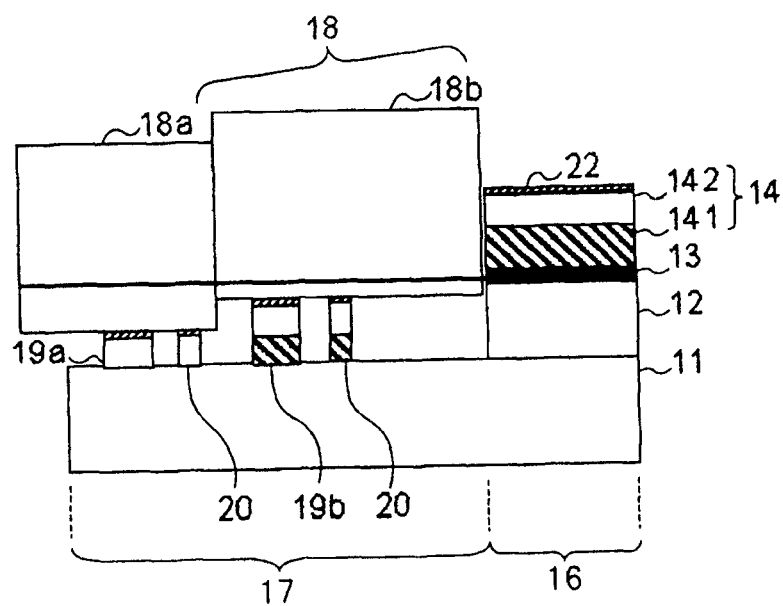
FIG. 6I is a sectional view showing the example of manufacturing the optical waveguide device shown in FIG. 4.

Subsequently, the light shield film is removed and an insulating film and electrode metal are formed and patterned as necessary (now shown). FIG. 6I shows an example in which optical elements 18a and 18b that have different active layer depths are mounted on optical waveguide device 10 after a necessary process is applied. As shown in FIG. 6I, the present invention allows optical elements 18a and 18b having different active layer depths to be optically coupled to the end face of optical waveguide 16 with high accuracy.

The description above has been made adopting the example of using the light shield film as the mask. However, even if etching selectivity with a film forming the optical waveguide formation layer is sufficient, only the photoresist film may be stacked instead of the light shield film and used as a mask. Even in a case of stacking both the light shield film and the photoresist film, the photoresist film may be left without exfoliation and used as a mask.

In order to perform image detection recognition of the alignment marker by infrared light at high contrast in a process of passive alignment mounting of the optical element, it is preferable not to remove the light shield film on the alignment marker. However, in a case where the thickness of the light shield film is not negligible, it is required that the light shield film be not used as the mask, the light shield film on the base block be removed in the end, or the thickness of the upper clad layer be determined by taking into consideration the thickness of the light shield film on the base block.

As described above, according to this exemplary embodiment, the optical elements having different active layer depths can optically be coupled to the end face of the optical waveguide with high accuracy. Further, formation of the base block adopting the film common to the upper clad layer enables the base block to be efficiently formed without expanding manufacturing processes.

In this exemplary embodiment, description has been made using the example of mounting two optical elements having different active layer depths. However, three or more optical elements with different active layer depths can be mounted. In this case, the number of stacks of the upper clad layers is preferably increased according to the number of the optical elements. Basically, in a case of mounting n (n is a natural number at least two) optical elements, at least n upper clad layers need to be formed. However, combination with etching allows the number of stacks of the upper clad layers to be adjusted.

In this exemplary embodiment, description has been made using an example of the case where the base block supporting the optical element with the larger active layer depth is formed from one stack of an upper clad layer, and the base block supporting the optical element with the smaller active layer depth is formed from two stacks of upper clad layers. Here, the number of stacks of the upper clad layers included in the base block is not limited to this example. However, basically, the base block supporting the optical element with the smaller active layer depth is formed from the upper clad layers whose number of stacks is larger than that of the base block supporting the optical element with the larger active layer depth. In order to avoid expanding the manufacturing processes, the base block supporting the optical element with the largest active layer depth among the optical elements is preferably formed from a single stack of the upper clad layer.

Second Exemplary Embodiment

Figure 7:
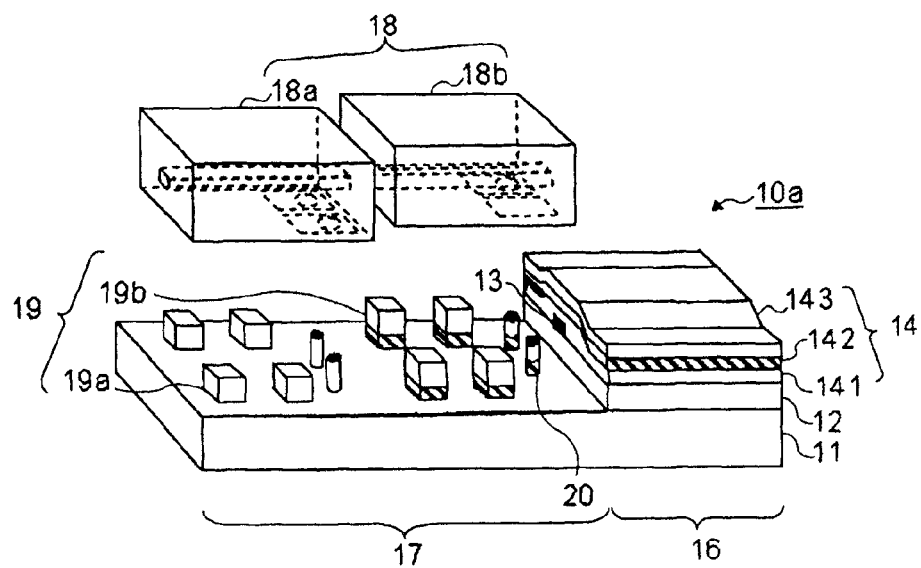
FIG. 7 is a perspective view showing an optical waveguide device according to a second exemplary embodiment of the present invention.

FIG. 7 is a perspective view showing optical waveguide device 10a according to a second exemplary embodiment. In comparison with the configuration of optical waveguide device 10 shown in FIG. 4, optical waveguide device 10a is different in that upper clad layer 14 includes three layers, and second upper clad layer 142 formed as a second layer and third upper clad layer 143 formed as a third layer are used for forming base block 19. The other components are identical to those of the first exemplary embodiment. Accordingly, the identical components are assigned with the identical signs. The description thereof is omitted.

First upper clad layer 141 is used for filling the narrow gap between cores caused mainly by patterning core layer 13 and thereby flattening the surface. First upper clad layer 141 is preferably a BPSG film. The BPSG film has a low melting point. This facilitates filling with the core in the reflow process and flattening the surface.

Figure 8A:
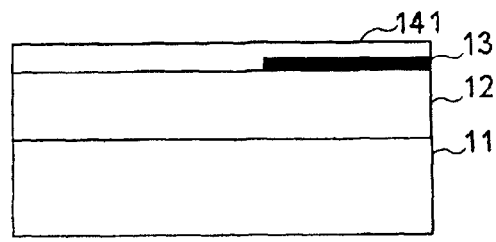
FIG. 8A is a sectional view showing a method of manufacturing the optical waveguide device shown in FIG. 7.
Figure 8B:
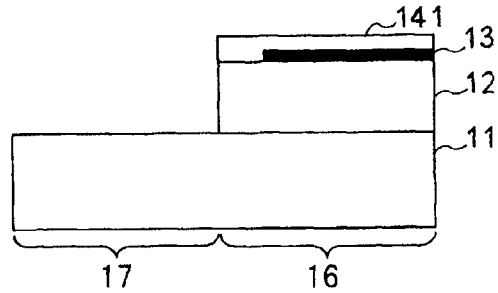
FIG. 8B is a sectional view showing the method of manufacturing the optical waveguide device shown in FIG. 7.

FIGS. 8A and 8B are sectional views showing a method of manufacturing optical waveguide device 10a shown in FIG. 7. First, steps of forming lower clad layer 12 and core layer 13 on silicon substrate 11 and of forming a waveguide by patterning are analogous to those of the first exemplary embodiment (see FIGS. 6A and 6B). Subsequently, first upper clad layer 141 is formed on lower clad layer 12 and core layer 13 (FIG. 8A). Next, lower clad layer 12 and first upper clad layer 141 on optical element mount 17 are removed (FIG. 8B).

Next, second upper clad layer 142 is formed on first upper clad layer 141. Steps after forming second upper clad layer 142 are identical to those of the first exemplary embodiment except that first upper clad layer 141 exists and the films common to second and third upper clad layers 142 and 143 are used for forming the base block. Accordingly, FIGS. 6D to 6I are referred to and the description thereof is omitted.

As described above, stacking of at least three upper clad layers fills a step due to the patterning of the core layer, thereby improves the flatness.

Even in a case where the total thickness of the second and third upper clad layers 142 and 143 is less than the film thickness required to cause the upper clad layer as a whole to perform an optical function, provision of first upper clad layer 141 allows the insufficient film thickness to be compensated. In a case where the thickness of a film which is needed to fill with the core is too large, it is preferable that the first upper clad layer be formed in a divided manner. That is, the first upper clad layer may be formed to a thickness optimal for filling the core and may be reflowed and subsequently formed as the second upper clad layer to the insufficient film thickness.

Note that first upper clad layer 141 may be used for forming base block 19.

An exemplary advantage according to the present invention is that optical elements with different active layer depths can be mounted while the optical axes are aligned.

INDUSTRIAL APPLICABILITY

The present invention is applicable to devices required to integrate and hybridly embed optical elements on a PLC, such as a variable wavelength light source using a ring resonator and a one-bit delay device for DPSK.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-063736 filed on Mar. 17, 2009, the content of which is incorporated by reference.

REFERENCE SIGNS LIST 10, 10a, 100 optical waveguide device
11, 111 silicon substrate
12, 112 lower clad layer
13, 113 core layer
14, 114 upper clad layer
141 first upper clad layer
142 second upper clad layer
143 third upper clad layer
15, 115 optical waveguide formation layer
16, 116 optical waveguide
17, 117 optical element mount
18, 118 optical element
19, 119 base block
20, 120 alignment marker
21, 121 active layer
22 mask

The invention claimed is:

1. An optical waveguide device that includes an optical waveguide formed from an optical waveguide formation layer that comprises a lower clad layer, a core layer and a plurality of upper clad layers formed on a substrate, and that includes an optical element mount on which optical elements are mounted in an area where a part of said optical waveguide formation layer is removed, at least one optical element from among said optical elements being optically coupled to an end face of said optical waveguide exposed by removing said part of the optical waveguide formation layer, wherein said optical element mount comprises:
  a first base block that supports a first optical element that is one optical element from among said optical elements; and
  a second base block that supports a second optical element that is one optical element of said optical elements, said second optical element having an active layer depth smaller than that of said first optical element, and wherein
  said second base block is formed from the plurality of upper clad layers having a number larger than a number of one or more of the plurality of upper clad layers of said first base block, and
  a difference in height between said first and second base blocks is equal to a difference in the active layer depth between said first and second optical elements.

2. The optical waveguide device according to claim 1, wherein each height of an optical axis of said second optical element supported by said second base block and an optical axis of said first optical element supported by said first base block matches an optical axis height of said optical waveguide formation layer from said substrate to the core layer.

3. The optical waveguide device according to claim 1, wherein said first base block supports the optical element that has a maximum active layer depth from among said optical elements and said first base block is formed from one upper clad layer.

4. The optical waveguide device according to claim 1, wherein the plurality of upper clad layers are formed from silicon dioxide or silicon nitride.

5. The optical waveguide device according to claim 4, wherein the silicon dioxide or silicon nitride is doped with P, Ge, B or Ti.

6. The optical waveguide device according to claim 1, wherein the lower clad layer is formed from silicon dioxide or silicon nitride.

7. The optical waveguide device according to claim 6, wherein the silicon dioxide or silicon nitride is doped with P, Ge, B or Ti.

8. The optical waveguide device according to claim 1, wherein the core layer has a higher refractive index than the plurality of upper clad layers and the lower clad layer.

9. The optical waveguide device according to claim 1, wherein the substrate is formed from silicon.

10. An optical element mount for an optical waveguide, comprising:
  a first base block that supports a first optical element of a plurality of optical elements; and
  a second base block that supports a second optical element of said plurality of optical elements, said second optical element having an active layer depth smaller than that of said first optical element, and wherein
  said second base block is formed from a plurality of upper clad layers having a number larger than a number of one or more of the plurality of upper clad layers of said first base block, and
  a difference in height between said first and second base blocks is equal to a difference in the active layer depth between said first and second optical elements.

11. The optical waveguide device according to claim 10, wherein each height of an optical axis of said second optical element supported by said second base block and an optical axis of said first optical element supported by said first base block matches an optical axis height of an optical waveguide formation layer from a substrate to a core layer.

12. The optical waveguide device according to claim 10, wherein said first base block supports the optical element that has a maximum active layer depth from among said optical elements and said first base block is formed from one upper clad layer.

* * * * *